UNITED STATES PATENT OFFICE.

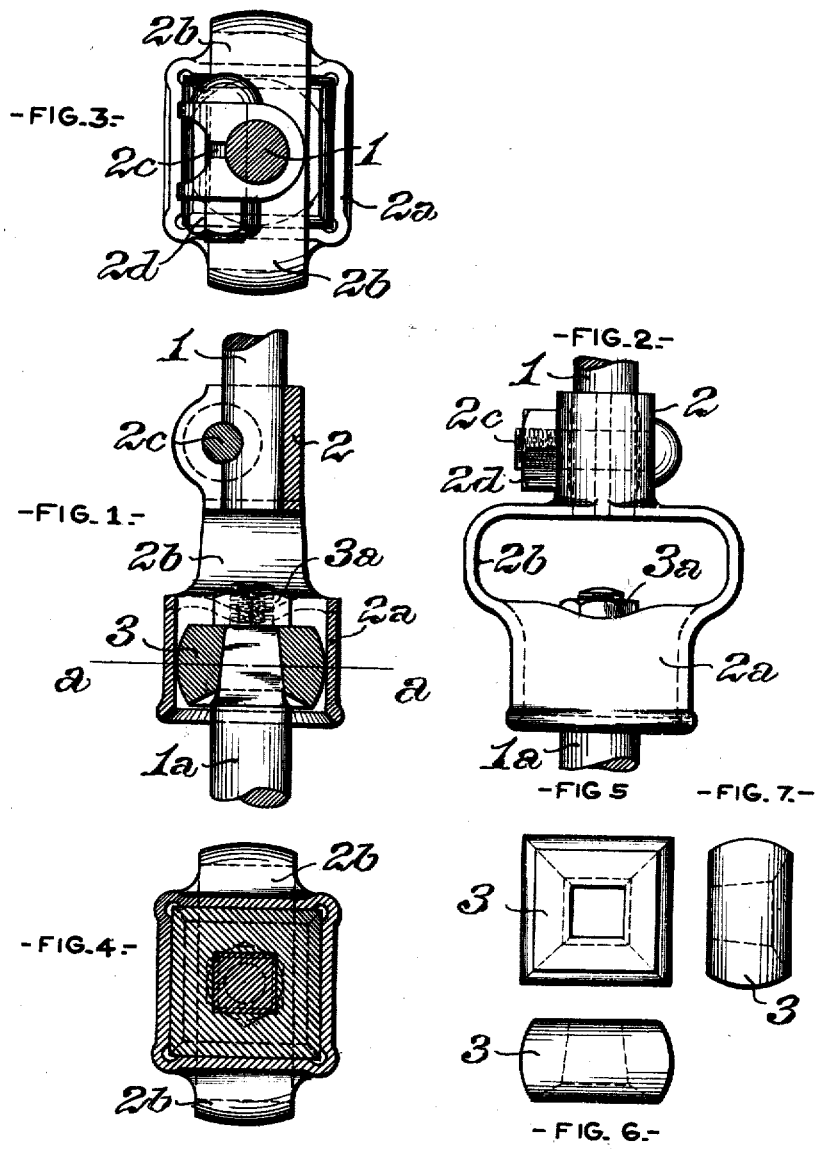

JAMES G. BLUNT, OF SCHENECTADY, NEW YORK.

UNIVERSAL JOINT.

1,340,368.   Specification of Letters Patent.   Patented May 18, 1920.

Application filed November 14, 1919.  Serial No. 337,967.

*To all whom it may concern:*

Be it known that I, JAMES G. BLUNT, of Schenectady, in the county of Schenectady and State of New York, have invented a certain new and useful Improvement in Universal Joints, of which improvement the following is a specification.

My invention relates to means for imparting rotation from a driving to a driven shaft, with the capacity of relative variation of one or both shafts from a common axial line, and its object is to provide a universal joint of a simple, compact, and inexpensive construction, which, in addition to permitting relative angular variation of a driving and a driven shaft in connection with which it is applied, will enable either of said shafts to be moved longitudinally, independently of the other, without departure from its operative relation thereto.

The improvement claimed is hereinafter fully set forth:

In the accompanying drawings: Figure 1 is a longitudinal central section through a universal joint embodying my invention: Fig. 2, a side view, in elevation, thereof, as seen from the right of Fig. 1; Fig. 3, an end view, as seen from the top of Fig. 1; Fig. 4, a transverse section, on the line *a a* of Fig. 1; Fig. 5, a plan view of the inner member of the joint; and, Figs. 6 and 7, side views, in elevation, thereof.

In the practice of my invention, referring descriptively to the specific embodiment thereof which is herein exemplified, I secure upon each of the adjacent ends of the two rotatory shafts, 1 and 1$^a$, which are to be connected, a coupling member, those of the two shafts being, respectively, of different construction, as will now be described.

The coupling member of one of the shafts, as the shaft, 1, which may be termed the outer coupling member, comprises a sleeve or collar, 2, formed on one of the ends of the member, which fits around the end of the shaft, and is secured thereto by a bolt or key; an open ended case or box, 2$^a$, of square transverse section, located at the opposite end of the member, the inner surfaces of the walls of which case constitute bearings for an inner coupling member hereinafter described; and outwardly curved legs of U form, which connect the sleeve and case, and space them apart for such distance as will permit the application and removal of the inner coupling member. In the instance shown, the collar, 2, is split on one side, and is clamped upon the shaft, 1, by a bolt, 2$^c$, let into the shaft, at a right angle thereto, and fitted with a nut, 2$^d$, bearing on one end of the split portion of the collar. It will be obvious that, if preferred, the collar may be unbroken laterally, and be secured to the shaft by a key, or other suitable means.

The adjacent end of the other shaft, 1$^a$, carries an inner coupling member, 3, which is secured upon it by a nut, 3$^a$, and is in form which would be developed, in section, by the intersection, at a right angle, of two cylinders of similar diameters, *i. e.*, of square transverse section, and having the surfaces of each pair of its opposite sides, curved cylindrically upon a radius struck from its middle point. The member, 3, is of less depth than, and fits neatly within, the case, 2$^a$, of the coupling member of the shaft, 1, and by reason of its form, of the curvature of its sides, and of the greater depth of the case, it will be seen that it has the capacity of both angular and longitudinal movement, relatively to the case, 2$^a$, in which it is inclosed.

In applications where variation of angular relation of the connected shafts in one plane only is required, the coupling member, 3, may have only one pair of its opposite sides cylindrically curved, the other being plane, and the member being thus a section developed from a single cylinder.

In the operation of the appliance, the coupling member, 3, of the shaft, 1$^a$, being, as above stated, free to move angularly, relatively to the case, 2$^a$, of the coupling member of the other shaft, the coupled shafts will have the same capacity of relative angular movement, and the bearing surfaces of the coupling members being of sufficient length to remain in contact in different relative longitudinal positions of the shafts, longitudinal movement of one or both of said shafts is thereby permitted.

I claim as my invention and desire to secure by Letters Patent:

In a universal joint connection for a driving and a driven shaft, the combination of an outer coupling member, comprising a sleeve, at one end, adapted for connection to one of the shafts, an open-ended case of square section, at the other end, and connecting legs, bridging a space between the sleeve and case; and an inner coupling member, secured, detachably, on the other shaft and insertible and removable through said space, said member being of less depth or axial extent than the case of the outer coupling member, and having cylindrically curved lateral faces, fitting tangentially on the bearing faces thereof.

JAMES G. BLUNT.

Witnesses:
 R. F. HALL,
 J. HOWARD WAGAR.